(12) United States Patent
Schuller et al.

(10) Patent No.: US 9,852,173 B1
(45) Date of Patent: Dec. 26, 2017

(54) SYSTEMS AND METHODS FOR USING A REACTION-BASED APPROACH TO MANAGING SHARED STATE STORAGE ASSOCIATED WITH A DISTRIBUTED DATABASE

(71) Applicant: TWITTER, INC., San Francico, CA (US)

(72) Inventors: Peter Schuller, San Francisco, CA (US); Sumeet Lahorani, San Francisco, CA (US); Stuart Hood, San Francisco, CA (US)

(73) Assignee: TWITTER, INC., San Francisco, CA (US)

( * ) Notice: Subject to any disclaimer, the term of this patent is extended or adjusted under 35 U.S.C. 154(b) by 430 days.

(21) Appl. No.: 14/685,485

(22) Filed: Apr. 13, 2015

Related U.S. Application Data

(60) Provisional application No. 61/978,689, filed on Apr. 11, 2014.

(51) Int. Cl.
*G06F 17/00* (2006.01)
*G06F 17/30* (2006.01)
*H04L 29/08* (2006.01)

(52) U.S. Cl.
CPC .. *G06F 17/30368* (2013.01); *G06F 17/30348* (2013.01); *G06F 17/30377* (2013.01); *H04L 67/1097* (2013.01)

(58) Field of Classification Search
CPC ......... G06F 17/30368; G06F 17/30348; G06F 17/30377; H04L 67/1097
USPC ...................................................... 707/609
See application file for complete search history.

(56) References Cited

U.S. PATENT DOCUMENTS

| | | | | |
|---|---|---|---|---|
| 8,977,679 | B2* | 3/2015 | Van Biljon | G06Q 30/04 709/203 |
| 9,547,533 | B2* | 1/2017 | Cheriton | G06F 9/542 |
| 2012/0271927 | A1* | 10/2012 | Shakirzyanov | G06F 9/5061 709/220 |
| 2012/0331342 | A1* | 12/2012 | Behrendt | G06F 9/542 714/23 |

(Continued)

OTHER PUBLICATIONS

Adya, Atul, et al., "Thialfi: A Client Notification Service for Internet-Scale Applications", SOSP '11, Cascais, Portugal, Oct. 23-26, 2011, pp. 129-142.*

(Continued)

*Primary Examiner* — Robert Stevens
(74) *Attorney, Agent, or Firm* — Marshall, Gerstein & Borun LLP

(57) ABSTRACT

Embodiments are provided for managing shared states of objects associated with a distributed database. According to certain aspects, a reactor machine interfaces with a coordination service that is in communication with the distributed database to coordinate the shared states of the objects. The coordination service notifies the reactor machine when a shared state of an object has changed and, in response, the reactor machine determines a desired state of the object by executing a reactor function. The reactor machine provides the desired state of the object to the coordination service, and the coordination service updates the shared state of the object to reflect the desired state of the object. Accordingly, the logic of the reactor machine is de-coupled from the complexities of the coordination service.

20 Claims, 7 Drawing Sheets

(56) References Cited

U.S. PATENT DOCUMENTS

2013/0060922 A1* 3/2013 Koponen ............ H04L 12/4633
709/223

OTHER PUBLICATIONS

Grover, Mark, "ZooKeeper fundamentals, deployment, and applications", IBM developerWorks, Aug. 27, 2013, pp. 1-9.*

Kalantari, Babak, et al., "Addressing the ZooKeeper Synchronization Inefficiency", ICDCN 2013, LNCS 7730, Springer-Verlag, Berlin, Germany, © 2013, pp. 434-438.*

Hunt, Patrick, et al., "ZooKeeper: Wait-free coordination for Internet-scale systems", USENIX Annual Technical Conference, vol. 8, Jun. 2010, 14 pages.*

Leberknight, Scott, "Distributed Coordination With ZooKeeper Part 3: Group Membership Example", Scott Leberknight's Weblog, posted on Jul. 1, 2013, 8 pages.*

Vernica, Rares, et al., "Adaptive MapReduce using Situation-Aware Mappers", EDBT 2012, Berlin, Germany, Mar. 26-30, 2012, pp. 420-431.* data.linkedin.com, "Apache Helix," (2015). 1 page Retrieved from the Internet on Apr. 17, 2015: http://data.linkedin.com/opensource/helix.

curator.apache.org, "Welcome to Apache Curator," (2015). 2 pages Retrieved from the Internet on Apr. 17, 2015: http://curator.apache.org/.

curator.apache.org, "Recipes," (2015). 2 pages Retrieved from the Internet on Jul. 23, 2015: http://curator.apache.org/curator-recipes/index.html.

curator.apache.org, "Framework," (2015). 3 pages Retrieved from the Internet on Jul. 23, 2015: http://curator.apache.org/curator-framework/index.html.

curator.apache.org, "Utilities," (2015). 2 pages Retrieved from the Internet on Jul. 23, 2015: http://curator.apache.org/utilities.html.

curator.apache.org, "Client," (2015). 2 pages Retrieved from the Internet on Jul. 23, 2015: http://curator.apache.org/curator-client/index.html.

curator.apache.org, "Error Handling," (2015). 2 pages Retrieved from the Internet on Jul. 23, 2015: http://curator.apache.org/errors.html page.

* cited by examiner

SYSTEMS AND METHODS FOR USING A REACTION-BASED APPROACH TO MANAGING SHARED STATE STORAGE ASSOCIATED WITH A DISTRIBUTED DATABASE

CROSS-REFERENCE TO RELATED APPLICATIONS

This application claims the benefit of U.S. Provisional Application No. 61/978,689, filed Apr. 11, 2014, which is incorporated by reference herein in its entirety.

FIELD

The present disclosure generally relates to distributed databases and, more particularly, to implementations for coordinating and synchronizing a distributed database.

BACKGROUND

Distributed database systems include a plurality of storage devices spread among a network of interconnected computers. The distributed database systems typically have greater reliability and availability than parallel database systems, among other benefits. Various internet services, for example social networking services, employ distributed database systems to manage the storage and retrieval of information. Generally, the need to efficiently and accurately read and write data across the database system increases with a greater amount of information, a greater number of users, and stricter latency requirements.

In distributed systems, there is a need for coordination and synchronization among the storage devices. In particular, the coordination and synchronization may be needed to ensure that only certain processes should perform certain tasks, ensure the proper execution of a set of functions, ensure the allocation of unique IDs, orchestrate multiple processes, and/or facilitate other coordination operations. Apache ZooKeeper™ is an example of an existing centralized service for maintaining configuration information, providing distributed synchronization, and providing group services.

However, the application programing interface (API) for ZooKeeper™ is complex such that faulty function calls or faulty services interfacing with ZooKeeper™ only fail in certain edge cases. As a result, these faulty function calls or faulty services may be difficult to detect or may otherwise go undetected, may be difficult for programmers to debug, and/or may cause difficulties in fencing. Accordingly, there is an opportunity for configurations and frameworks that decrease the complexity exposed to developers for many use-cases of a distributed database.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

DETAILED DESCRIPTION

Figure 1A:
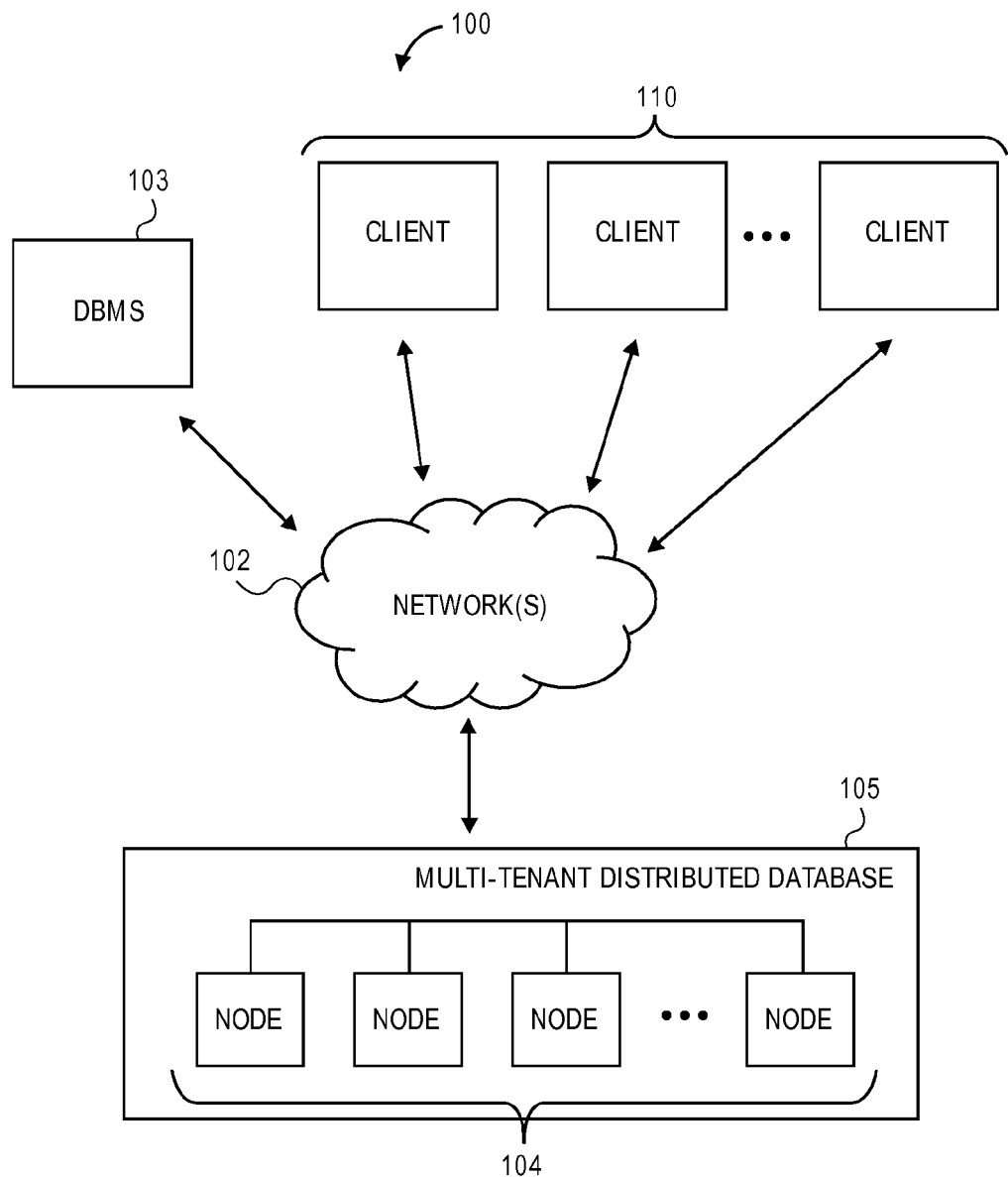
FIG. 1A depicts a system capable of implementing a distributed database in accordance with some embodiments.

According to the present embodiments, systems and methods for coordinating and synchronizing a distributed database are disclosed. In an aspect, a reactor service may implement a reactor-based approach to managing shared states associated with the distributed database. The reactor service may interface with a coordination service (e.g., Apache ZooKeeper™) via a dedicated application programming interface (API), where the coordination service is configured to coordinate and synchronize the distributed database. The reaction-based approach may enable the reactor service to facilitate various functionalities in response to updates to shared states within the distributed database that are detected by the coordination service, where the functionalities are de-coupled from the complexities encountered in conventional coordination services.

Coordination services are used to provide an infrastructure for synchronizing and coordinating a set of nodes associated with a distributed database, where the set of nodes may be distributed across a plurality of machines and/or located in diverse geographic locations. The coordination services may be used by applications and services to ensure that tasks across the distributed database are serialized and/or synchronized. Examples of such synchronization include enabling only one process to perform a certain task, maintaining an order of a set of steps to be performed by multiple processes, allocating unique IDs, and orchestrating multiple processes that require actions by other nodes to be executed.

The coordination services are implemented with hardware servers capable of maintaining state information associated with objects and other data stored within the distributed database. In one implementation, the state information may be in the form of a file that is updated by any node in the distributed database, and any node may register to be notified of changes to a particular file. Accordingly, each node may access the most recent version of the particular file, or the "shared state" of the particular file.

As understood, applications may interface with a coordination service via a dedicated API that includes a set of commands that may be synchronously or asynchronously used with callbacks to notify the applications of the completion of various events. The applications may, in certain situations, synchronize their tasks across the distributed database by updating a particular file, which causes the coordination service to inform the nodes of the distributed database of the particular file update. However, correctly using these API calls by the applications proves complex and results in faulty function calls or faulty services that are difficult to detect or otherwise go undetected, difficulties for programmers to debug, and/or difficulties in fencing.

The reactor service as described by the present embodiments is configured to interface with the coordination service. The reactor service may be implemented as an API to the coordination service and may include a variety of components and modules that simplify the coordination and synchronization of the distributed database. The reactor service envisions implementing and/or managing these components and modules, and may initiate in response to certain triggers detected by the coordination service, such as a change in a shared state of an object.

According to implementations, the reactor service may implement a reaction driver that may interface with a set of reactor functions. The reaction driver may monitor for updates to a shared state of an object associated with the distributed database, such as via a notification from the coordination service. In response to an update of a shared state of an object, the reaction driver may retrieve an observed state of the object from the coordination service as well as call a designated reactor function to retrieve a desired state of the object. The reaction driver may then communicate with the coordination service to facilitate an update to the shared state of the object to reflect the desired state, where necessary. In some implementations, the reaction driver may execute additional "secondary" functions in certain circumstances. In one scenario, the reaction driver may execute a secondary function if the update to the shared state is successful.

The present embodiments offer various benefits and improve on existing implementations of coordination services for distributed databases. Existing APIs for coordination services are overly complex such that faulty function calls or faulty services interfacing with the coordination services do not fail when they are supposed to, resulting in faulty function calls and faulty services going undetected, being difficult for programmers to debug, and/or causing difficulties in fencing. The reactor service described in the present embodiments decreases the complexity exposed to developers for implementing and testing various use-cases within a distributed database. The reactor service further provides an approach to orchestration that enables highly available decision-making logic separate from coordination services, while avoiding having to solve the fencing problem outside of the coordination services. Additional features and their benefits are envisioned and discussed herein.

The systems and methods therefore address a challenge that is particular to coordinating and synchronizing a distributed database. In particular, the challenge relates to a high level of complexity required to interface with a coordination service that coordinates and synchronizes a distributed database, whereby users such as programmers experience faulty function calls or faulty services that go undetected, and have difficulty debugging certain issues. This is particularly apparent when fencing is needed to isolate a set of malfunctioning nodes. Instead of faulty use cases not failing when they should fail due to the complexity of a corresponding API, as is prone to happen in conventional coordination services, the systems and methods implement highly available decision-making logic outside of a coordination service which decreases the complexity of the associated API. Accordingly, the systems and methods are necessarily rooted in computer technology in order to overcome the noted shortcomings that specifically arise in the realm of distributed database coordination and synchronization.

Similarly, the systems and methods provide improvements in a technical field, namely, database management. Instead of the systems and methods merely being performed by hardware and software components using basic functions, the systems and methods employ complex steps that go beyond the mere concept of simply coordinating shared state within a distributed database. In particular, a reaction driver monitors for state changes from a coordination service, calls a reactor function to determine a desired state, and communicates with the coordination service to facilitate updating the shared state to reflect the desired state. This combination of elements imposes meaningful limits in that the operations are applied to improve database management by reducing the complexities of the API and, as a result, improving the accuracy of use case testing in a meaningful and effective way.

FIG. 1A illustrates a general system architecture of a system 100 implementing a multi-tenant distributed database 105. The distributed database 105 may include multiple nodes 104 of storage devices or computer resources that are distributed across a plurality of physical computers, such as a network of interconnected computers. The multiple nodes 104 may be virtually or physically separated, and may be configured to interface with one or more processing units such as one or more CPUs. Each of the nodes 104 may store one or more replicas of one or more datasets, and may include one or more various types of storage devices (e.g., solid state drives (SSDs), platter storage such as hard disk drives, or other memory) and structures (e.g., SSTable, seadb, b-tree, or others). A distributed database management system (DBMS) 103 may be configured to manage the distributed database 105, whereby the DBMS 103 may be stored on a centralized computer within the system 100.

The system 100 further includes a plurality of clients 110 configured to access the distributed database 105 and features thereof via one or more networks 102. It should be appreciated that the network 102 may be any type of wired or wireless LAN, WAN, or the like. For example, the network 102 may be the Internet, or various corporate intranets or extranets. In embodiments, each of the plurality of clients 110 is a dedicated computer machine, workstation, or the like, including any combination of hardware and software components. Further, a user such as a developer, engineer, supervisor, or the like (generally, a "customer") may interface with any of the plurality of clients 110 to access the distributed database 105 and configure various services to be supported thereon. It should be appreciated that the plurality of clients 110 may also interface with the DBMS 103.

Figure 1B:
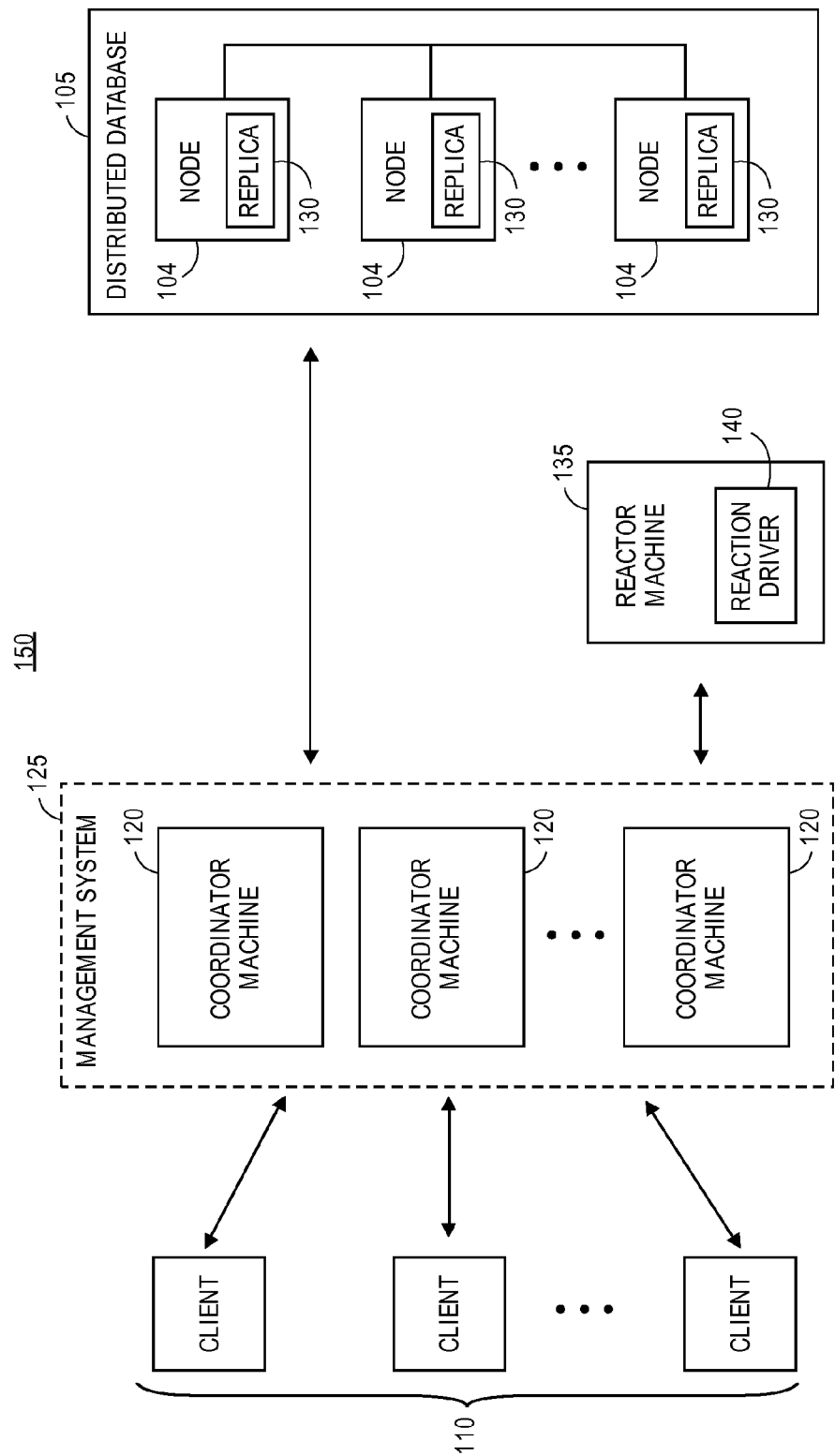
FIG. 1B depicts a detailed representation of various components configured to manage a distributed database in accordance with some embodiments.

FIG. 1B illustrates a system 150 having components capable of implementing the systems and methods of the present embodiments. The system 150 includes the distributed database 105 stored across a plurality of nodes 104, as discussed with respect to FIG. 1A. Each of the nodes 104 may store one or more replica representations 130 of one or more datasets.

The system 150 further includes a management system 125, which may serve as or be separate from the DMBS 103 as discussed with respect to FIG. 1A. The management system 125 includes a plurality of coordinator machines 120 that may be distributed throughout various physical or virtual locations and may be configured to connect to one another. Each of the coordinator machines 120 may manage various services associated with storing and managing datasets within the distributed database 105.

In one case, each of the coordinator machines 120 may manage one or more services to identify appropriate replica representations 130 and interface with the identified replica representations 130 for dataset storage and management. The coordinator machines 120 may collectively manage the coordination and synchronization of data objects distributed across the plurality of nodes 104. Customers may operate one or more of the clients 110 to interface with one or more of the coordinator machines 120, where the particular coordinator machine 120 is selected based on availability or other factors.

In one implementation, one of the coordinator machines 120 may be designated as the "leader" that may connect to and synchronize the remaining coordinator machines 120. The "leader" coordinator machine 120 may ensure consistency and synchronization of the data objects distributed across the plurality of nodes 104. In another implementation, the set of coordinator machines 120 may communicate with each other and may collectively ensure consistency and synchronization of the data objects distributed across the plurality of nodes 104.

Figure 1C:
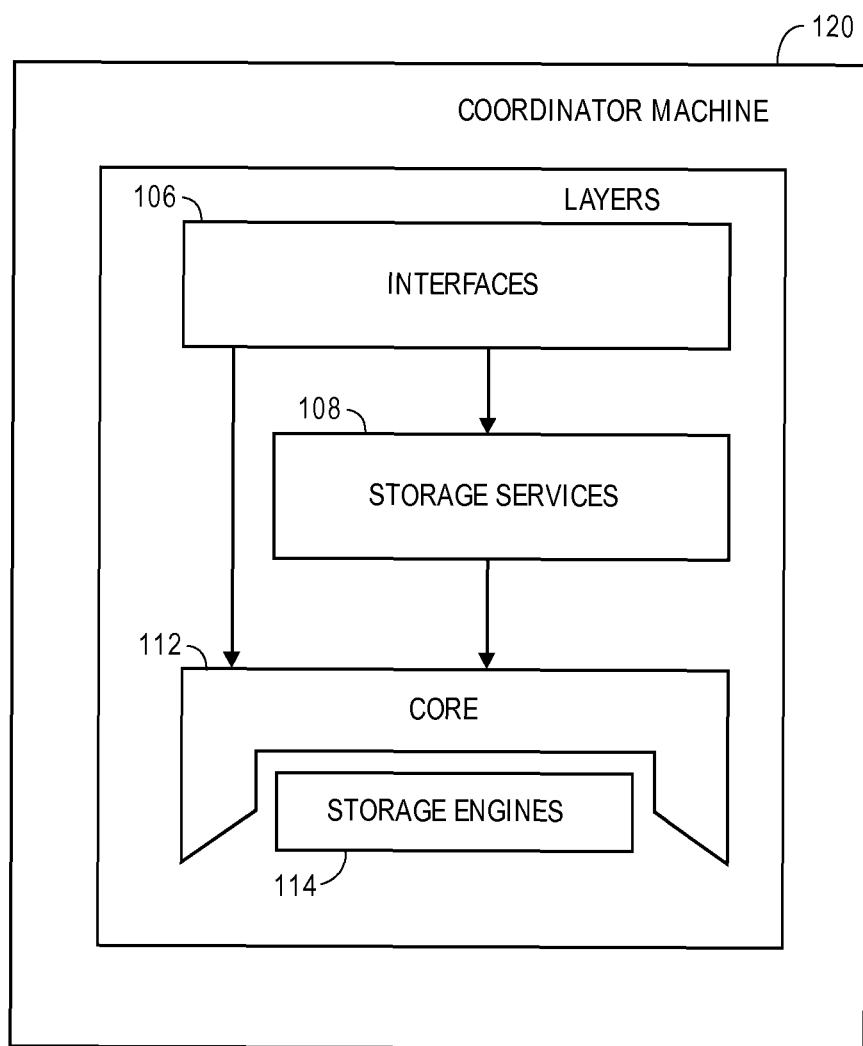
FIG. 1C depicts a representation of various layers supported by a coordinator machine in accordance with some embodiments.

FIG. 1C illustrates a more detailed representation of the coordinator machine 120 and various features that the coordinator machine 120 is capable of supporting or managing. Although only one coordinator machine 120 is depicted in FIG. 1C, it should be appreciated that each of the coordinator machines 120 of the management system 125 may include the same components and support the same services. As illustrated in FIG. 1C, the coordinator machine 120 supports four layers: an interfaces layer 106, a storage services layer 108, a core layer 112, and a storage engines layer 114.

Generally, the core layer 112 is configured to manage or process failure events, consistency models within the distributed database 105, routing functionality, topology management, intra- and inter-datacenter replication, and conflict resolution. The storage engines layer 114 is configured to convert and/or process data for storage on various physical memory devices (e.g., SSD, platter storage, or other memory). The storage services layer 108 supports applications or features that enable customers to manage the importing and storage of data within the distributed database 105. For example, some of the applications or features include batch importing, managing a strong consistency service, and managing a timeseries counters service. The interfaces layer 106 manages how customers interact with the distributed database 105, such as customers interacting with the distributed database 105 via the clients 110.

Referring back to FIG. 1B, the system 150 may further include a reactor machine 135 that may be one or more dedicated computer machines, workstations, or the like, and may include any combination of hardware and software components. The reactor machine 135 may interface with the management system 125 and the coordinator machines 120 thereof. As depicted in FIG. 1B, the reactor machine 135 may include a reaction driver 140 which may be a dedicated application or module capable of facilitating various functionalities associated with the systems and methods described herein.

Generally, the reactor machine 135 may be configured to facilitate various operations in response to changes in shared state of objects associated with the distributed database 105, such as a change in a shared state that is detected by one of the coordinator machines 120. The reaction driver 140 may retrieve an observed state for an object from the coordination service when such a change is detected, and may initiate an appropriate reactor function to retrieve a desired state for that object. The reaction driver 140 may also facilitate, with the coordinator machine 120, an update to the shared state of the object to reflect the desired state for the object. In this regard, the shared state of the object that is maintained by the coordinator machine(s) 120 reflects what is specified by the logic of the appropriate reactor function.

The reaction driver 140 may also initiate a desired secondary function or a set of secondary functions to update related data and/or data that is otherwise not associated with the distributed database 105, or otherwise facilitate other functionalities associated with the system 150. For example, the reactor machine 135 may request an update to the shared state to indicate that a specified coordinator machine 120 should restart itself. When the specified coordinator machine 120 receives the request from the reactor machine 135, the specified coordinator machine 120 may update the shared state to indicate that the specified coordinator machine 120 is restarting itself and may also request the reaction driver 140 to call an appropriate secondary function. In this example, the appropriate secondary function is a function to restart the specified coordinator machine 120. Accordingly, the reaction driver 140 may call the appropriate secondary function to restart the specified coordinator machine 120.

Generally, the set of reactor functions and the set of secondary functions may be programmable to include high-level domain-specific logic. Because the reactor machine 135 is separate from the coordinator machines 120, the high-level domain-specific logic of the set of reactor functions and the set of secondary functions is de-coupled from the complexities of the coordinator machines 120, such as the complexities associated with the API of the coordinator machines 120. Accordingly, implementing and testing services by customers within the distributed database 105 is improved.

Figure 2:
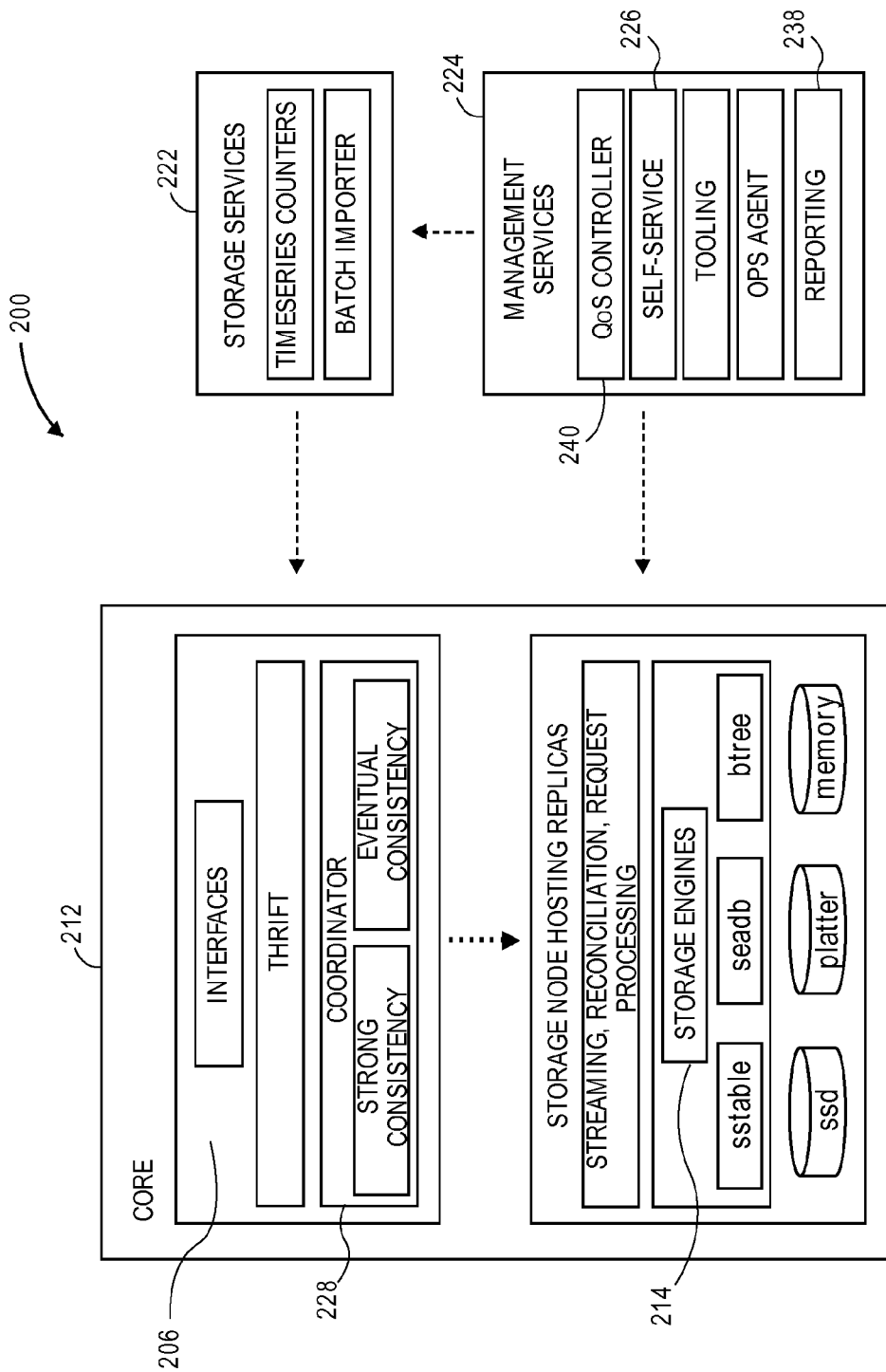
FIG. 2 depicts an example representation of entities and components associated with managing services of a distributed database in accordance with some embodiments.

FIG. 2 illustrates an example representation 200 of various applications and functionalities related to the distributed database system. The applications and functionalities may be managed by the coordinator machines 120 as described with respect to FIGS. 1B and 1C. In particular, the representation 200 identifies various modules managed by each of the coordinator machines 120, as well as communication paths among the modules, the layers, and the storage components associated with the distributed database system.

As illustrated in FIG. 2, the representation 200 includes a core layer 212 (such as the core layer 112 as discussed with respect to FIG. 1C), a storage services module 222, and a management services module 224. The core layer 212 may communicate with an interfaces layer 206 (such as the interfaces layer 106 as discussed with respect to FIG. 1C) and a storage engines layer 214 (such as the storage engines layer 114 as discussed with respect to FIG. 1C). The management services module 224 is configured to communicate with the core layer 212, and includes various components, applications, modules, or the like that facilitate various systems and methods supported by the distributed database system. The storage services module 222 is also configured to communicate with the core layer 212, and also includes various components, applications, modules, or the like that facilitate additional systems and methods supported by the distributed database system.

The storage engines layer 214 is configured to manage data storage on the distributed database as well as maintain data structures in memory. The storage engine layer 214 supports at least three different storage engines: (1) seadb, which is a read-only file format for batch processed data (e.g., from a distributed system such as Apache Hadoop), (2) SSTable, a log-structured merge (LSM) tree-based format for heavy write workloads, and (3) b-tree, a b-tree based format for heavy read and light write workloads. Customers may directly or indirectly select an appropriate storage engine for processing datasets based on the service or use-case of the service.

For example, if the dataset is static and/or can be generated using a distributed system, the customer may want to select a read/only selection corresponding to the seadb storage engine. For further example, in the Twitter® social networking service, if the dataset changes dynamically, such as if the dataset includes at least one "Tweet®" and at least one Twitter® user, then the customer may want to select a read/write selection corresponding to the SSTable or b-tree storage engine. Generally, the b-tree storage engine is a better choice for a lot of data reads and the SSTable storage engine is a better choice for a lot of data writes. The management services module 224 initiates an appropriate workflow based on the selected storage engine. The management services module 224 further supports multiple types of clusters for storing datasets: a first, general cluster for storing general data as well as a second, production cluster for storing sensitive data.

The management services module 224 may further include a reporting module 238 configured for various reporting functionalities. The reporting module 238 may support an integration between the datasets being stored and external services and teams, and may enable the automatic reporting of certain usage of the distributed database system to the external services and teams. According to some embodiments, the reporting module 238 may support an API to a "capacity team," or a team tasked with managing the capacity of the distributed database system (generally, a moderator), such that the capacity team may manage customer usage, model capacity metrics, and collect raw data for customers. By managing the capacity of the system, the capacity team may effectively and efficiently manage the associated resources of the distributed database system. In some embodiments, the reporting module 238 may generate reports associated with data usage resulting from consistency model management.

In operation, if a customer creates, tests, or otherwise uses a service and the usage amount exceeds an amount of resources allocated to the customer, the management services module 224 may place the service into a pending state and cause the reporting module 238 to automatically generate a service ticket that indicates the service's usage or requested usage, and provide the service ticket to the capacity team. The capacity team may examine the service ticket and interface with the customer to handle or manage the usage request. In particular, the capacity team may approve the increased capacity and enable the service use by the customer, or may reject the increased capacity.

The reporting module 238 may also generate a report if a customer's service exceeds a quota or threshold, along with details of the excess usage. The reporting module 238 may aggregate the reports such that, over time, the capacity team may analyze the usage data to generate resource planning recommendations. For example, the data from the aggregated reports may indicate that more resources are needed to handle the excess usage requests.

The management services module 224 further supports a "self-service" interface module 226 that enables customers to configure services or applications within the distributed database, as well as configure various functionalities related thereto, such as consistency model configurations. In particular, the self-service interface module 226 enables a customer to make selections, via various user interfaces, associated with initiating various services and applications supported by the distributed database as well as managing data stored in the distributed database. A customer may interface with the self-service interface module 226 via the user interface which the self-service interface module 226 may cause to be displayed on one of the plurality of clients 110.

The self-service interface module 226 further enables the customer to select various functionalities associated with dataset management using the distributed database. In one particular case, the customer can select a rate limiting functionality to set rate limits (e.g., limits on queries per second) associated with data reads and/or data writes. Further, the customer can configure custom alerts associated with meeting or exceeding rate limits. Still further, the customer can select to have reports detailing resource usage and other metrics generated (e.g., by the reporting module 238) at various time intervals or in response to various triggers. Moreover, the self-service interface can enable customers to modify certain parameters (e.g., increase or decrease resource usage limits) after a service is initiated.

The self-service interface module 226 further enables the customer to select various consistency model configurations for a service. In general, distributed systems support a specific consistency model. When data is stored in a distributed system, the data must propagate among multiple computer resources or clusters before it has achieved replica convergence across the distributed system. Certain consistency models have benefits and drawbacks when compared to other consistency models. As discussed herein, an eventually consistent database enables users to store and retrieve data without delay. However, because there is no delay in retrieving data, there is not a guarantee that the retrieved data is completely up-to-date (i.e., is consistent across the distributed system). In contrast, a strongly consistent database requires that all resources or clusters have the same view of stored data. Accordingly, when a user retrieves certain data, that data is guaranteed to be up-to-date, though with a higher read latency, a lower read throughput, and the potential for more failures.

For most tasks and applications supported by a given service, having an eventually consistent database is sufficient. For example, a user of the Twitter® social networking service may not want a long delay when opening his or her "stream" or "feed" but also may not mind (or may not notice) that a "Tweet®" posted to Twitter® in the last fractions of a second is not presented in the stream or feed. However, there may be some tasks in which a strongly consistent database is preferred. For example, Twitter® may require a strongly consistent database when storing Twitter® handles (i.e., usernames) so as to ensure that the same handle will not be assigned to multiple end users.

The interface layer 206 therefore supports a coordinator module 228 that is configured to interface with the management services module 224 and manage consistency models within the distributed database system. In particular, a customer may interface with the self-service interface module 226 to specify the consistency model as well as various customization and configuration features associated therewith, for different applications and services to be supported by the distributed database system. Accordingly, the customer is able to configure services with varying tradeoffs between availability (i.e., how quickly something can be read) and consistency (i.e., confidence that the retrieved data is up-to-date).

According to embodiments, the customer may interface with the self-service interface module 226 to specify a certain consistency model for data reads and another (or the same) consistency model for data writes, or specify multiple consistency models for data read and/or data write operations that are managed by the coordinator module 228. Additionally, the customer may interface with the self-service interface module 226 to select how long a certain service should be strongly consistent and/or eventually consistent. In particular, the customer may specify, for data writes, a time period for eventual consistency and another time period for strong consistency. Similarly, the customer may specify, for data reads, a time period for eventual consistency and another time period for strong consistency.

The self-service interface module 226 may further enable a customer to specify additional customizations for a certain service. In particular, the self-service interface module 226 may enable a customer to select a replication factor for data writes (i.e., how many copies of the data are written to the clusters). In operation, if the replication factor is less than a total amount of the clusters, then the latency for data reads from the clusters may be reduced.

According to embodiments, the database may be distributed among multiple data centers, such as multiple local data centers, where each local data center may support various consistency models. Accordingly, the self-service interface module 226 may further enable the customer to select to leverage local data centers for strongly consistent writes. In operation, if database writes are strongly consistent for a local data center, then there is a guarantee that the data is up-to-date in that local data center but there is not a guarantee that the data is up-to-date across the quorum of remaining data centers. However, if the distributed database leverages local data centers for strongly consistent writes, the latency of database reads from all data centers may be reduced.

To support multiple services and multiple consistency models associated therewith, the distributed database enables multiple customers to use the same resources or cluster, whereby each customer is allotted a certain amount of the resources or cluster. In some scenarios, a customer may actually need more resources than what is originally envisioned by the customer and/or what is originally allocated to the customer. Because a multi-tenant system concurrently supports multiple use cases for multiple customers, it is likely that one or more of the customers are below a corresponding allocated capacity at a given time. Accordingly, the management services module 224 may support a rate-limiting service operated by a QoS controller 240 to manage customer usage of the resources or clusters of the distributed database across many metrics and ensure that no one service affects others on the system. In particular, the rate-limiting service may limit usage by certain of the customers and, in some cases, dynamically reallocate certain resources for certain of the customers to effectively utilize the total amount of resources or clusters within the distributed database.

After a customer specifies the various consistency model configurations for a service, the QoS controller 240 may determine whether the required amount of resources of the distributed database are available to support the service. If the required amount of resources is available, the QoS controller 240 may instantiate the resources and enable the service to access the resources, whereby the coordinator module 228 may manage the corresponding resources of the distributed database according to the configured consistency model. Of course, the customer may request additional resources for a particular application which the QoS controller 240 may additionally configure or instantiate.

Figure 3:
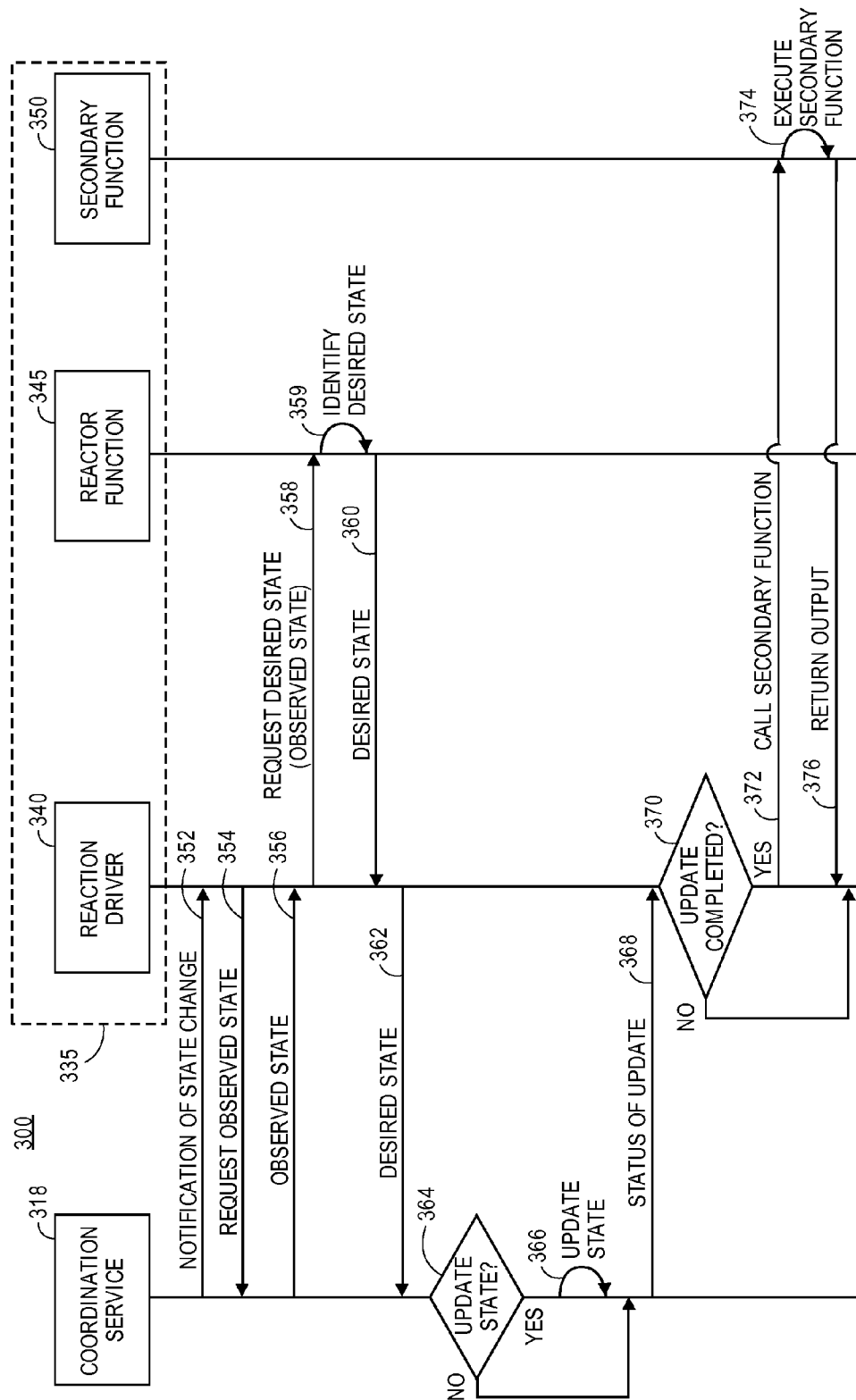
FIG. 3 depicts a signal diagram associated with coordinating a distributed database using a reactor machine in accordance with some embodiments.

FIG. 3 illustrates a signal diagram 300 associated with managing shared states within a distributed database using a reactor-based technique. The signal diagram 300 includes a coordination service 318, a reaction driver 340 (such as the reaction driver 140 discussed with respect to FIG. 1B), a reactor function 345, and a secondary function 350. The reaction driver 340, the reactor function 345, and the secondary function 350 may be included as part of a reactor machine 335 (such as the reactor machine 135 discussed with respect to FIG. 1B). Each of the reactor function 345 and the secondary function 350 may be a function or method that the reaction driver 340 may call or initiate. Further, each of the reactor function 345 and the secondary function 350 may be respectively included in a set of reactor functions and a set of secondary functions.

The signal diagram 300 may begin when the coordination service 318 sends (352), to the reaction driver 340, a notification of a state change to an object. In some embodiments, the reaction driver 340 may be monitoring for this notification of the state change, thus causing the coordination service 318 to send the notification when the coordination service 318 detects the state change. In response to receiving the notification, the reaction driver 340 may request (354) the observed state of the object from the coordination service 318. The observed state may represent what the coordination service 318 detects as the changed state of the object that caused the coordination service 318 to send the notification of the state change to the reaction driver 340. The coordination service 318 may accordingly send (356) the observed state of the object to the reaction driver 340.

In some scenarios, the observed state of the object may not be the desired state for the object, such as when the observed state is an intermediary state. For example, assume that the desired state of a system is that an example coordinator machine A has a full copy of some data object A. However, in an intermediary state, coordinator machine A may only have a partial or no copy of data object A which would be reflected in the observed state of data object A. Eventually, when coordinator machine A does obtain a full copy of data object A, coordinator machine A may update its shared state to reflect as such. It should be appreciated that the desired state of the object may be identical to the observed state of the object, and the reactor machine 335 accordingly may have nothing to update.

The desired state may be specified by the high-level domain-specific logic included in the reactor function 345 that is separate from the coordination service 318. Accordingly, the reaction driver 340 may request (358) the desired state of the object via a function call to the reactor function 345. In particular, the reaction driver 340 may call the reactor function 345 using the observed state as the input. The reactor function 345 may execute and accordingly identify (359) the desired state of the object based on the observed state. The reactor function 345 may further send (360) the desired state to the reaction driver 340 (i.e., the desired state of the object is the return value of the reactor function 345).

After receiving the desired state of the object from the reactor function 345, the reaction driver 340 may send (362) the desired state to the coordination service 318. In particular, the reaction driver 340 may initiate a function call to the coordination service 318 with the desired state of the object as the input. The coordination service 318 may determine (364) whether to update the shared state of the object. To determine whether to update, the coordination service 318 may compare the version of the observed state of the object to the version that the desired state of the object is based on.

In one scenario, if the desired state of the object is based on a version that does match the current version of the observed state of the object, the coordination service 318 may determine to update the shared state ("YES"). Accordingly, the coordination service 318 may update (366) the shared state of the object to reflect the desired state of the object. In another scenario, if the desired state of the object is based on a version that does not match the current version of the observed state of the object (i.e., the observed state has changed since the observed state that was the basis for the desired state provided by the reactor function 345), then the coordination service 318 may determine to not update the shared state ("NO"). In some embodiments in this scenario, the coordination service 318 may update the shared state of the object to reflect the observed state of the object, such as if the coordination service 318 needs to synchronize the shared state across multiple machines.

The coordination service 318 may send (368) a status of the update to the reaction driver 340, where the status may indicate whether the coordination service 318 updated the shared state of the object to reflect the desired state of the object. The reaction driver 340 may examine the status to determine (370) whether the update to the shared state was completed. If the update to the shared state was not completed ("NO") (i.e., the coordination service 318 did not update the shared state of the object to reflect the desired state), processing may end or proceed to other functionality.

In contrast, if the update to the shared state was completed ("YES") (i.e., the coordination service 318 updated the shared state of the object to reflect the desired state), the reaction driver 340 may call (372) the secondary function 350. In some implementations, the reaction driver 340 may first identify the secondary function 350 based on the desired state of the object, or the reaction driver 340 may call the secondary function 350 using the desired state of the object as an input. The secondary function 350 may execute (374) and may return (376) any resulting output or status to the reaction driver 340.

Figure 4:
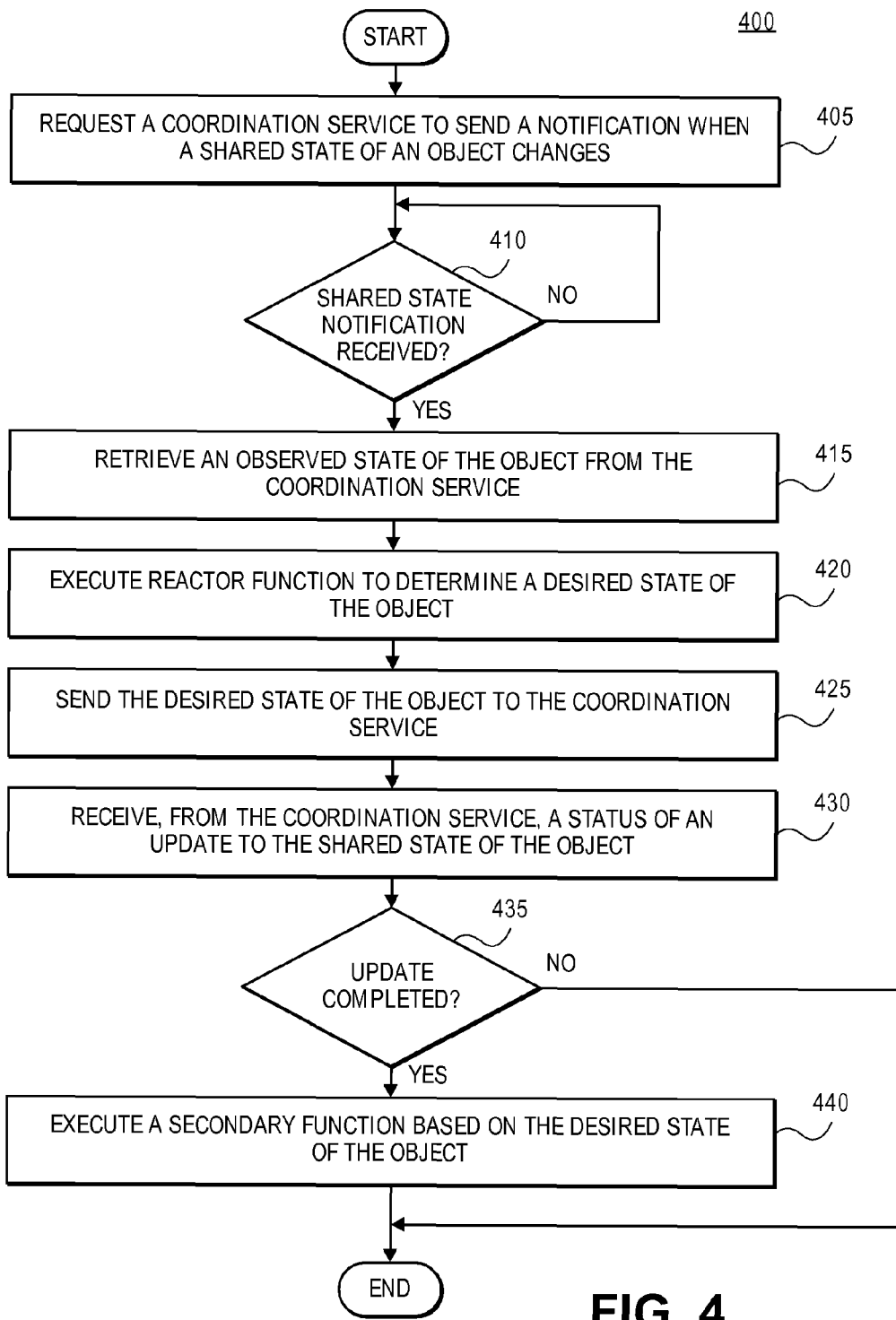
FIG. 4 depicts a flow chart of an example method for managing shared states of objects associated with a distributed database in accordance with some embodiments.

FIG. 4 illustrates a diagram of a method 400 of managing shared states of objects associated with a distributed database. The method 400 may be facilitated by a reactor machine (such as the reactor machine 135 discussed with respect to FIG. 1B), or any combination of hardware and/or software components. The reactor machine may be configured to interface with a coordination service that coordinates shared states of objects stored within the distributed database.

The method 400 begins with the reactor machine requesting (block 405) a coordination service to send a notification when a shared state of an object changes. In particular, the reactor machine may make an appropriate API call to the coordination service to be notified of a change in shared state of the object. Accordingly, the reactor machine may continuously monitor (block 410) for a notification from the coordination service of a change in the shared state of the object.

If a notification is not received ("NO"), the reactor machine may continue to monitor for the notification until a terminate condition is reached. If a notification is received ("YES"), the reactor machine may retrieve (block 415) an observed state of the object from the coordination service. The observed state of the object may reflect the change in the shared state of the object, however the observed state may not be a desired state of the object according to logic implemented within the reactor machine.

Accordingly, the reactor machine may execute (block 420) a reactor function to determine a desired state of the object, where the reactor function may use the observed state of the object as an input. The reactor function may have associated domain-specific logic that is separate from the coordination service and therefore bypasses the complexities associated with interfacing with the API of the coordination service. Additionally, a user may create or modify the domain-specific logic so as to effectively and efficiently modify the implementation and any desired results without having to interface with the coordination service.

After the reactor function determines the desired state of the object, the reactor machine may send (block 425) the desired state of the object to the coordination service. In embodiments, the coordination service may determine whether to update the shared state of the object to reflect the desired state. In particular, the coordination service may compare the current version of the observed state to the version of the observed state that was the basis for the desired state and, if they match, the coordination service may update the shared state of the object to reflect the desired state.

The reactor machine may accordingly receive (block 430), from the coordination service, a status of an update to the shared state of the object. The status may indicate whether the coordination service updated the shared state of the object to reflect the desired state. The reactor machine may examine the status to determine (block 435) whether the update was completed. If the update was not completed ("NO") (i.e., the coordination service did not update the shared state to reflect the desired state), then the method 400 may end or proceed to other functionality. If the update was completed ("YES") (i.e., the coordination service updated the shared state to reflect the desired state), then the reactor machine may execute (block 440) a secondary function based on the desired state of the object. In executing the secondary function, the reactor machine may update other data or objects associated with the reactor machine and/or with the distributed database.

Figure 5:
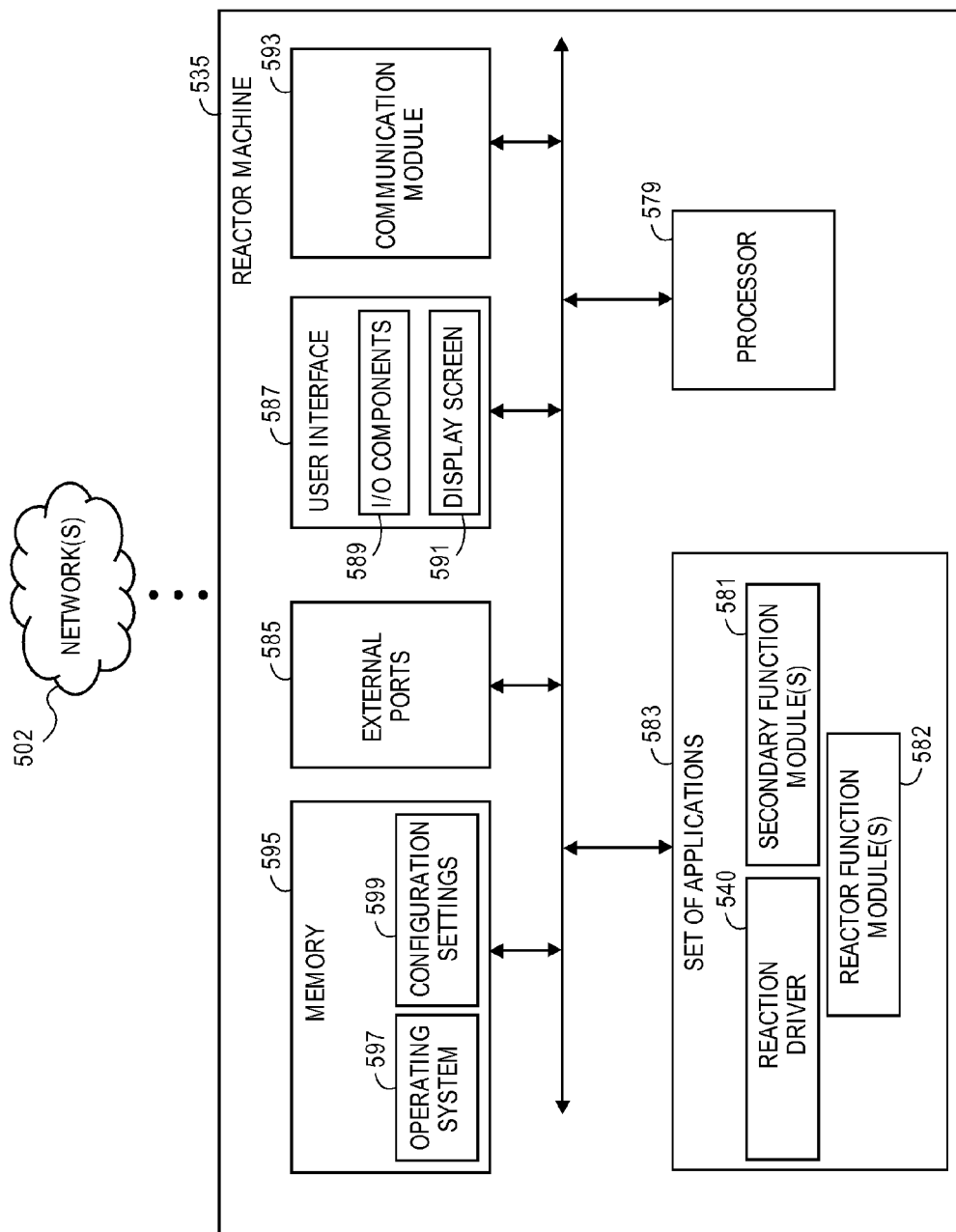
FIG. 5 depicts a hardware diagram of a reactor machine in accordance with some embodiments.

FIG. 5 illustrates an example reactor machine 535 via which the functionalities as discussed herein may be implemented. In some embodiments, the reactor machine 535 may be the reactor machine 135 as discussed with respect to FIG. 1B. Generally, the reactor machine 535 is a dedicated computer machine, workstation, or the like, including any combination of hardware and software components.

The reactor machine 535 may include a processor 579 or other similar type of controller module or microcontroller, as well as a memory 595. The memory 595 may store an operating system 597 capable of facilitating the functionalities as discussed herein. The processor 579 may interface with the memory 595 to execute the operating system 597 and a set of applications 583. The set of applications 583 (which the memory 595 may also store) may include a reaction driver 540 (such as the reaction driver 140 as discussed with respect to FIG. 1B) configured to facilitate the reaction-based functionalities associated with a coordination service of a distributed database. The set of applications 583 may further include a set of reactor function modules 582 and a set of secondary function modules 581 that may be executable by the reaction driver 540. It should be appreciated that the set of applications 583 may include one or more other applications or modules not depicted in FIG. 5.

Generally, the memory 595 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The reactor machine 535 may further include a communication module 593 configured to interface with one or more external ports 585 to communicate data via one or more networks 502. For example, the communication module 593 may leverage the external ports 585 to establish a wide area network (WAN) or a local area network (LAN) for connecting the reactor machine 535 to other components such as one or more coordinator machines or other resources associated with a distributed database. According to some embodiments, the communication module 593 may include one or more transceivers functioning in accordance with IEEE standards, 3GPP standards, or other standards, and configured to receive and transmit data via the one or more external ports 585. More particularly, the communication module 593 may include one or more wireless or wired WAN and/or LAN transceivers configured to connect the electronic device 581 to the WANs and/or LANs.

The reactor machine 535 may further include a user interface 587 configured to present information to the user and/or receive inputs from the user. As illustrated in FIG. 5, the user interface 587 includes a display screen 591 and I/O components 589 (e.g., capacitive or resistive touch sensitive input panels, keys, buttons, lights, LEDs, cursor control devices, haptic devices, and others).

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 579 (e.g., working in connection with the operating system 597) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

What is claimed is:

1. A computer-implemented method of interfacing with a coordination service to manage shared states of objects associated with a distributed database having a plurality of computing devices, the coordination service in communication with the distributed database to coordinate the shared states of the objects, the computer-implemented method comprising:

receiving, from the coordination service in communication with the distributed database, a notification that a shared state of an object stored within the distributed database has changed;
 in response to receiving the notification, retrieving an observed state of the object from the coordination service;
 determining, by a computer processor, a desired state of the object based on the observed state of the object; and
 sending the desired state of the object to the coordination service, wherein the coordination service updates the shared state of the object to reflect the desired state of the object.

2. The computer-implemented method of claim 1, wherein determining the desired state of the object comprises:

executing a reactor function with the observed state of the object as an input, wherein the reactor function returns the desired state of the object.

3. The computer-implemented method of claim 1, further comprising:

receiving, from the coordination service, a status of the update to the shared state of the object.

4. The computer-implemented method of claim 3, wherein the status of the update indicates that the shared state of the object was replaced with the desired state of the object, and wherein the method further comprises:

executing a secondary function based on the desired state of the object.

5. The computer-implemented method of claim 1, further comprising:

executing a secondary function based on the desired state of the object.

6. The computer-implemented method of claim 1, further comprising:

requesting the coordination service to send the notification when the coordination service detects that the shared state of the object has changed.

7. A system for interfacing with a coordination service to manage shared states of objects associated with a distributed database having a plurality of computing devices, the coordination service in communication with the distributed database to coordinate the shared states of the objects, the system comprising:

a reactor machine executed by one or more computer processors and adapted to interface with the coordination service, the reactor machine configured to:
  receive, from the coordination service in communication with the distributed database, a notification that a shared state of an object stored within the distributed database has changed,
  in response to receiving the notification, retrieve an observed state of the object from the coordination service,
  determine a desired state of the object based on the observed state of the object, and
  send the desired state of the object to the coordination service, wherein the coordination service updates the shared state of the object to reflect the desired state of the object.

8. The system of claim 7, wherein to determine the desired state of the object, the reactor machine is configured to:

execute a reactor function with the observed state of the object as an input, wherein the reactor function returns the desired state of the object.

9. The system of claim 7, wherein the reactor machine is further configured to:

receive, from the coordination service, a status of the update to the shared state of the object.

10. The system of claim 9, wherein the status of the update indicates that the shared state of the object was replaced with the desired state of the object, and wherein the reactor machine is further configured to:
   execute a secondary function based on the desired state of the object.

11. The system of claim 7, wherein the reactor machine is further configured to:
   execute a secondary function based on the desired state of the object.

12. The system of claim 7, wherein the reactor machine is further configured to:
   request the coordination service to send the notification when the coordination service detects that the shared state of the object has changed.

13. A system for managing shared states of objects associated with a distributed database having a plurality of computing devices, comprising:
   a coordination service comprising a memory for storing the shared states of the objects, the coordination service in communication with the distributed database to coordinate the shared states of the objects;
   a reactor machine executed by one or more computer processors and adapted to interface with the coordination service, the reactor machine configured to:
      receive, from the coordination service, a notification that a shared state of an object stored within the distributed database has changed,
      in response to receiving the notification, retrieve an observed state of the object from the coordination service,
      determine a desired state of the object based on the observed state of the object, and
      send the desired state of the object to the coordination service, wherein the coordination service updates the shared state of the object according to the desired state of the object.

14. The system of claim 13, wherein the coordination service is further configured to:
   send, to the reactor machine, a status of the update to the shared state of the object.

15. The system of claim 14, wherein the status of the update indicates that the shared state of the object was replaced with the desired state of the object, and wherein the reactor machine is further configured to:
   execute a secondary function based on the desired state of the object.

16. The system of claim 13, wherein the reactor machine is further configured to:
   execute a secondary function based on the desired state of the object.

17. The system of claim 13, wherein to update the shared state of the object, the coordination service is configured to:
   compare the observed state of the object to the desired state of the object to determine that the observed state differs from the desired state, and
   update the shared state of the object to reflect the desired state of the object.

18. The system of claim 13, wherein to update the shared state of the object, the coordination service is configured to:
   compare the observed state of the object to the desired state of the object to determine that the observed state does not differ from the desired state; and
   update the shared state of the object to reflect the observed state of the object.

19. The system of claim 13, wherein to determine the desired state of the object, the reactor machine is configured to:
   execute a reactor function with the observed state of the object as an input, wherein the reactor function returns the desired state of the object.

20. The system of claim 13, wherein the reactor machine is further configured to:
   request the coordination service to send the notification when coordination service detects that the shared state of the object has changed.

* * * * *